Feb. 18, 1936.   G. PFAFF   2,030,935
ELECTRIC POWER TRANSMISSION SYSTEM
Filed July 29, 1935
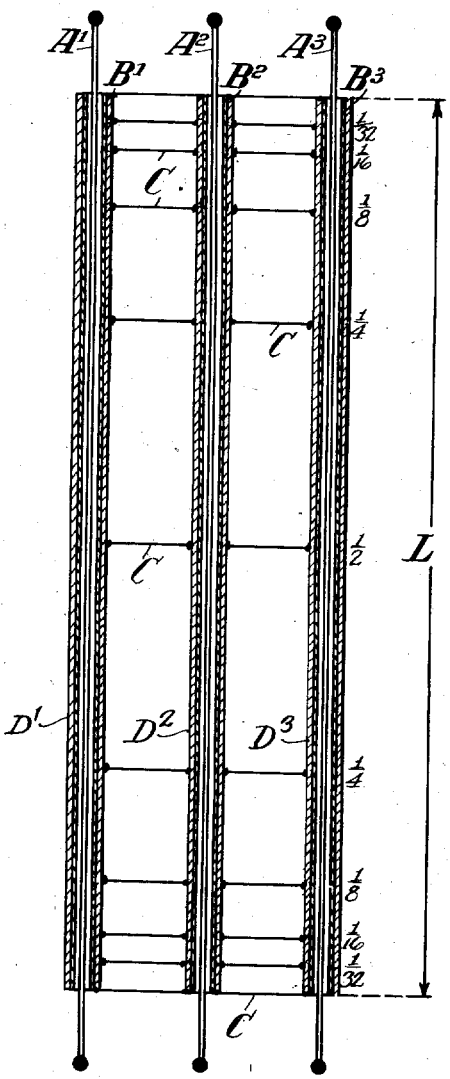
Inventor
Georg Pfaff
by [signature]
Attorney Patented Feb. 18, 1936

2,030,935

UNITED STATES PATENT OFFICE 2,030,935

ELECTRIC POWER TRANSMISSION SYSTEM

Georg Pfaff, Breslau, Germany, assignor to Vereinigte Zünder- und Kabelwerke A.-G., Meissen/Sachsen, Germany Application July 29, 1935, Serial No. 33,799
In Germany November 9, 1932

6 Claims. (Cl. 171—97)

This invention relates to electric power transmission systems, and more specifically to transmission systems employing single-core insulated cables.

The overall diameter of multi-core cables for the transmission of substantial alternating currents at high voltages becomes unduly large when the insulated cores are stranded together and surrounded by a common lead sheath, with the result that the cost of manufacture of long distance transmission cables of this type is very high. If, on the other hand, power transmission be effected by single-core cables laid side by side, while manufacture is greatly simplified and cheapened, special precautions have to be taken for obviating induction and other injurious effects on the cable sheath and outer protective armor.

The present invention provides improved means whereby such effects may be minimized in a simple and inexpensive manner.

In carrying out the invention good conductors of non-magnetic material are laid along the lead sheaths of the single-core cables in intimate connection therewith. These good conductors in the parallel laid cables of associated phases are short-circuited by a plurality of cross-connections, the distance between which according to the invention progressively decreases from the midpoint of the cable-run towards the ends. The best result is obtained when the cross-connections are arranged at distances varying in accordance with the geometrical progression $\frac{1}{2}$, $\frac{1}{4}$, $\frac{1}{8}$, $\frac{1}{16}$, etc.

A preferred arrangement in accordance with the invention is illustrated in the accompanying diagrammatic drawing wherein $A^1$, $A^2$, $A^3$, denote the three single cable cores of a three phase line, the sheaths being indicated at $B^1$, $B^2$, $B^3$. The good conductor may be applied to the cable sheath in any well known manner, for instance, in the form of helically arranged wires, conducting strips or the like. In the drawing the good conductors are indicated at $D^1$, $D^2$, $D^3$, in the form of a tubular layer of copper surrounding the sheath, in intimate contact therewith. Along the total length L of these separately laid cables cross-connections C are provided which connect the good conductors of the three phases together. The middle connection is located as indicated by the figures on the drawing at a distance ½ L from the two ends; the next connections are at distance of ¼ L; the next at ⅛ L measured from both ends, and so on, at distance progressively diminishing in accordance with a geometrical progression. In the diagrammatic drawing it is assumed for the sake of clarity that the distances from the two ends have diminished to $\frac{1}{32}$ of the total length. In an actual construction, however, the divisions according to the geometrical progression given should be carried further to within a very small distance of the two ends. In practice this can always be effected with relatively few cross connections.

It is known that the use of a good conductor in intimate contact with the cable sheath serves to reduce the currents induced in the sheath and it is also known that the provision of numerous cross connections between the good conductors of associated phases results in the induced currents in the sheaths being greatly reduced and further electrostatic charges on the sheath being compensated. By reason of the particular distribution of the shortcircuiting cross-connections in accordance with the present invention, however, the further result is obtained that the induced currents in the cable sheath are suppressed substantially in their entirety, since these injurious currents can only be induced in the two end sections (which can be made very small) while in the remaining sections induced sheath currents cannot be produced since the voltages induced therein substantially completely neutralize one another in consequence of the arrangement adopted. A further advantage of the arrangement of the cross connections according to the geometrical progression ½, ¼, ⅛, $\frac{1}{16}$, etc. is the small amount of material required as compared with numerous other measures which have previously been tried for eliminating induced currents.

Although even with an equidistant distribution of the cross-connections the induced current flowing in the sheath occurs only in the two end sections as a result of the inductive effect, while the inductive effects of the other sections neutralize one another, so that the cross-connections with the exception of those located at the ends carry no induced currents, it is necessary to bear in mind that in such an arrangement the decrease of harmful inductive currents is a function of the number of cross-connections used, so that the harmful currents could only be practically eliminated if the distance between cross-connections were made very small. Therefore it will be seen that for such an arrangement a much greater amount of material would be necessary. If, for instance, the end sections were made equal to $\frac{1}{16}$ of the total length, then seventeen cross connections would be required as compared with nine in an arrangement in accordance with the present invention, having end sections of a corresponding length. The continuation of the geometrical progression leads to still more favourable ratios. I have found that the new arrangement provided by the invention makes it possible to suppress the induced sheath current just as perfectly as the arrangement of the cross connections at very small equal distances. These uniform distances must not be made infinitely small by placing the sheaths together, since then eddy currents involving loss, which are obviated in the new arrangement, would occur.

The invention is not limited to polyphase power transmission installations.

Having now particularly described and ascertained the nature of my said invention and in what manner the same is to be performed, I declare that what I claim is:—

1. A high voltage power transmission system comprising single-core insulated lead covered cables, said cables having in intimate contact with the lead sheath supplementary conductors of high conductivity, and a plurality of cross-connecting conductors interconnecting said supplementary conductors at intervals which progressively diminish from the median point of the cable-run towards the ends thereof.

2. A polyphase high voltage power transmission system comprising separate single-core insulated lead covered cables for each phase, said cables having in intimate contact with the lead sheath supplementary conductors of high conductivity, and a plurality of cross-connecting conductors interconnecting said supplementary conductors at intervals which progressively diminish from the median point of the cable-run towards the ends thereof.

3. A high voltage power transmission system comprising single-core insulated lead covered cables, said cables having in intimate contact with the lead sheath supplementary conductors of high conductivity, and a plurality of cross-connecting conductors interconnecting said supplementary conductors at intervals which progressively diminish from the median point of the cable-run towards the ends thereof in accordance with a geometrical progression.

4. A polyphase high voltage power transmission system comprising separate single-core insulated lead covered cables for each phase, said cables having in intimate contact with the lead sheath supplementary conductors of high conductivity, and a plurality of cross-connecting conductors interconnecting said supplementary conductors at intervals which progressively diminish from the median point of the cable-run towards the ends thereof in accordance with a geometrical progression.

5. A high voltage power transmission system comprising single-core insulated lead covered cables, said cables having in intimate contact with the lead sheath supplementary conductors of high conductivity, and a plurality of cross-connecting conductors interconnecting said supplementary conductors at intervals which progressively diminish from the median point of the cable-run towards the ends thereof, the interval between any except the middle cross-connection and the cross-connection immediately following in the direction of the nearest end of the line being one half that between the former cross-connection and the cross-connection immediately preceding it in the direction of the middle of the transmission line.

6. A polyphase high voltage power transmission system comprising separate single-core insulated lead covered cables for each phase, said cables having in intimate contact with the lead sheath supplementary conductors of high conductivity, and a plurality of cross-connecting conductors interconnecting said supplementary conductors at intervals which progressively diminish from the median point of the cable-run towards the ends thereof, the interval between any except the middle cross-connection and the cross-connection immediately following in the direction of the nearest end of the line being one half that between the former cross-connection and the cross-connection immediately preceding it in the direction of the middle of the transmission line.

GEORG PFAFF.